United States Patent Office 3,751,517
Patented Aug. 7, 1973

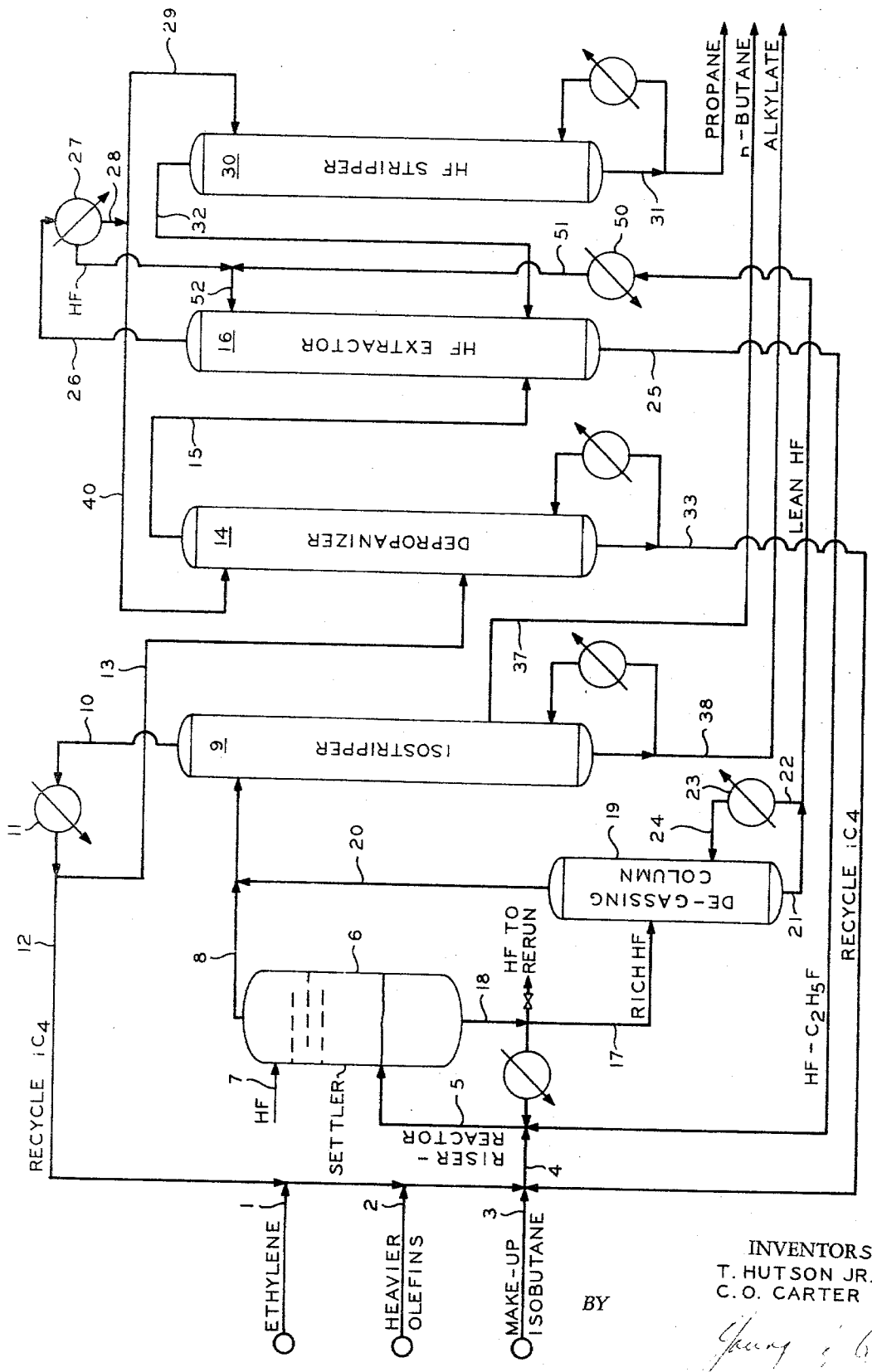

3,751,517
RECOVERY OF ALKYL FLUORIDE IN ALKYLATION OF ISOPARAFFIN WITH ETHYLENE AND A HIGHER OLEFIN PROMOTER

Thomas Hutson, Jr., and Cecil O. Carter, Bartlesville, Okla., assignors to Phillips Petroleum Company
Filed Mar. 3, 1971, Ser. No. 120,588
Int. Cl. C07c 3/54
U.S. Cl. 260—683.48          4 Claims

ABSTRACT OF THE DISCLOSURE

In the alkylation of an isoparaffin wih an olefin in the presence of hydrofluoric acid as catalyst wherein the total olefin feed and/or isoparaffin stream includes or is converted in part to propane and alkyl fluoride formed in the operation is found in a propane containing stream, said stream is contacted with liquid hydrogen fluoride to extract the alkyl fluoride from the propane and the thus enriched hydrogen fluoride is charged to the alkylation, the propane being recovered from the usual hydrogen fluoride stripper.

---

The alkylation of an isoparaffin with ethylene in which alkylation there is present a higher olefin, e.g., isobutylene, is described and claimed in our copending application Ser. No. 79,405, filed Oct. 12, 1970, now abandoned.

This invention relates to alkylation. In one of its aspects it relates to the production of an alkylate by alkylation of an isoparaffin with an olefin employing hydrogen fluoride as a catalyst. In another of its aspects the invention relates to an alkylation operation in which there is employed a total olefin stream and isoparaffin stream which contains propene or in which operation propane is produced along with alkyl fluoride, e.g., ethyl fluoride which is difficultly separable from the propane.

According to a concept of the invention alkyl fluoride present together with a hydrocarbon from which it is difficultly separable for example ethyl fluoride in a propane stream is recovered from propane stream by treating the stream under extraction conditions with liquid hydrofluoric acid catalyst following which the acid catalyst enriched by the alkyl fluoride extracted from the propane is used in the alkylation of isoparaffin with olefin. In another of its concepts the invention recovers propane substantially free from alkyl fluoride, e.g., ethyl fluoride from a provided HF stripper.

The invention will be described in connection with an operation in which isobutane is alkylated with ethylene and there is present in the alkylation a higher olefin for example isobutylene in the production of diisopropyl employing hydrofluoric acid catalyst which may or may not be promoted with say $BF_3$. In such an alkylation it is possible that from about 10 to about 20 weight percent or more of the ethylene will react to form ethyl fluoride. A substantial loss of feed and catalyst is incurred if the ethyl fluoride is not recovered. Propane and/or propylene are ordinarily contained in the high olefin, e.g., isobutylene which is used to promote the reaction to form the diisopropyl. Propane also is usually present in the isoparaffin, e.g., in isobutane. There is a problem of recovery of the ethyl fluoride because it boils very closely together with propane. At 1 atmosphere pressure ethyl fluoride boils at $-37.7°$ C. and propane boils at $-42.17°$ C.

We have now conceived that the ethyl fluoride should be recovered by extraction thereof from the propane stream using liquid hydrofluoric acid catalyst in an HF extraction zone. Thus upon treatment of the alkylation reaction zone effluent ultimately to depropanize the same obtaining a propane stream containing ethyl fluoride the propane stream is treated under extraction conditions in an HF extraction zone. Further, we have conceived that the HF acid enriched in alkyl fluoride should be stripped from the propane for reuse while the propane is removed as bottoms from an HF stripping zone provided for the purpose.

It is an object of this invention to provide a process for the alkylation of isoparaffin with an olefin. Further it is an object of this invention to provide an economical alkylation of an isoparaffin with ethylene in the presence of a higher olefin in a process in which there is formed unavoidably ethyl fluoride and propane (or at least a portion of propane can enter with the feed) which are difficultly separable because of their close boiling points. Still further it is an object of this invention to provide such an alkylation process in which the propane and the alkyl fluoride are separated with facility. Another object of the invention is to provide a process as described wherein the catalyst employed is utilized in a triple function namely as an alkylation catalyst, as an agent or solvent to recover alkyl fluoride and to purify propane.

Other aspects, concepts, objects and the several advantages of the invention are apparent from this disclosure, the drawing and the appended claims.

According to the present invention in an alkylation of an isoparaffin with an olefin, e.g., isobutane with ethylene in the presence of a higher olefin, e.g., isobutylene wherein there is formed unavoidably propane and alkyl fluoride, e.g., ethyl fluoride (or the propane can enter the system with feed hydrocarbon) there is provided a process which comprises treating the effluent from the alkylation reaction to recover therefrom a stream containing propane and alkyl fluoride, subjecting said stream to alkyl fluoride extraction conditions employing liquid HF acid catalyst as an extraction medium, recycling alkyl fluoride containing liquid HF acid catalyst to the alkylation reaction, passing an HF and propane containing stream to an HF stripping zone, in said stripping zone stripping HF acid from the propane and recovering propane from said stripping zone.

In the drawing there is shown diagrammatically an alkylation operation according to the invention.

Referring now to the drawing there are fed respectively by 1, 2, and 3 ethylene, a heavier olefin stream and makeup isobutane. As later described these feeds, together with recycle isobutane are fed by 4 to alkylation riser-reactor 5. The reaction mass is passed to settler 6. Makeup acid as desired is fed by 7 into the settler.

A hydrocarbon phase containing alkylate is taken off from settler 6 by 8 and passed to isostripper 9. In isostripper 9 isobutane and lighter is separated and removed as overhead by 10, cooler 11 and recycled by 12 and 4 to reactor 5. A portion of the recycle stream in 12 is passed by 13 to depropanizer 14. Overhead from depropanizer 14 is the stream treated according to the invention and contains propane and ethyl fluoride and is passed 15 to HF absorber or extractor 16. That amount of isostripper overhead charged via 13 to the depropanizer is sufficient to rid the alkylation system of introduced and produced propane.

Returning to alkylation reactor 5, acid phase, is removed by 18 and a portion is passed via 17 to HF degassing column 19. This decreases the amount of light hydrocarbons in the HF so that the HF is more capable of extracting ethyl fluoride from stream 15 in extractor 16. Vapors from column 19 are passed by 20 and by 8 to isostripper 9 for further treatment. The bottoms of the degassing column are reboiled by removing therefrom HF acid by 21 and passing the same by 22 through heater 23 and by 24 back to the column. HF acid is 21, which is lean with respect to light hydrocarbons, is passed to chiller 50 and by 51 and 52 into the upper portion HF extractor 16. In HF extractor 16 alkyl fluoride is dissolved into the HF acid. This acid is passed as bottoms by 25 into riser-reactor 5. Propane containing HF is taken overhead from HF extractor 16 by 26 into cooler condenser accumulator. Phase separation occurs in 27. A portion of liquid phase hydrocarbon from 27 is passed by 28 and 29 as feed to HF stripper 30. Propane liquid, substantially free of HF and ethyl fluoride, is recovered via 31. The propane stripper is reboiled as shown. Another portion of the liquid phase hydrocarbon is passed via 28 and 40 to the upper portion of depropanizer 14 as reflux. HF is removed via 32 as vapor from HF stripper 30 and charged to the lower portion of extractor 16. The purified liquid phase HF stream from accumulator 27 is charged via 52, along with lean HF from conduit 51, as solvent for ether fluoride which is introduced into extraction tower 16 via conduit 15. Normal butane vapor is recovered from isostripper 9 via conduit 37. Isostripper 9 is reboiled as shown. Debutanized alkylate is recovered via conduit 38. Additional isobutane for recycle is passed via 33 from depropanizer 14 and to reactor 5. Depropanizer 14 is reboiled as shown.

SPECIFIC EXAMPLE

|  | Tons/day | Barrels/day |
|---|---|---|
| Fresh feed (1+2+3): |  |  |
| Ethylene | 375.6 |  |
| Butylene | 370.2 | 352.9 |
| Ethane | 3.1 | 47.0 |
| Propane | 5.7 | 64.3 |
| Isobutane | 781.6 | 7,942.5 |
| n-Butane | 32.7 | 320.1 |
| Total | 1,563.2 |  |
| Combined reactor feed (less HF to 5): |  |  |
| Ethylene | 388.6 |  |
| Ethyl fluoride | 1,448.4 |  |
| Butylene | 370.2 | 352.9 |
| Ethane | 6.2 | 93.9 |
| Propane | 686.0 | 7,740.9 |
| Isobutane | 12,787.0 | 129,940.2 |
| n-Butane | 36.0 | 352.4 |
| Total | 15,722.4 |  |
| Isostripper overhead product (10): |  |  |
| Ethylene | 26.1 |  |
| Ethyl fluoride | 1,426.0 |  |
| Butylene | 0 |  |
| Ethane | 6.2 | 93.9 |
| Propane | 686.0 | 7,740.9 |
| Isobutane | 12,005.4 | 121,997.7 |
| n-Butane | 3.3 | 32.3 |
| HF acid | 804.0 | 4,596.1 |
| Total | 14,957.0 |  |
| Depropanizer feed (13): |  |  |
| Ethylene | 13.1 |  |
| Ethyl fluoride | 713.0 |  |
| Butylene | 0 |  |
| Ethane | 3.1 | 47.0 |
| Propane | 343.0 | 3,870.4 |
| Isobutane | 6,002.7 | 60,998.8 |
| n-Butane | 1.7 | 16.6 |
| HF acid | 402.0 | 2,298.0 |
| Total | 7,478.6 |  |
| HF extractor feed (15): |  |  |
| Ethylene | 13.1 |  |
| Ethyl fluoride | 713.0 |  |
| Butylene | 0 |  |
| Ethane | 3.1 | 47.0 |
| Propane | 343.0 | 3,870.4 |
| Isobutane | 0 |  |
| n-Butane | 0 |  |
| HF acid | 402.0 | 2,298.0 |
| Total | 1,474.2 |  |
| Depropanizer kettle product (33): |  |  |
| Ethylene | 0 |  |
| Ethyl fluoride | 0 |  |
| Butylene | 0 |  |
| Ethane | 0 |  |
| Propane | 0 |  |
| Isobutane | 6,002.7 | 60,998.8 |
| n-Butane | 1.7 | 16.6 |
| Total | 6,004.4 |  |
| Recycle isobutane (12): |  |  |
| Ethylene | 13.0 |  |
| Ethyl fluoride | 713.0 |  |
| Butylene | 0 |  |
| Ethane | 3.1 | 47.0 |
| Propane | 343.0 | 3,870.4 |
| Isobutane | 6,002.7 | 60,998.8 |
| n-Butane | 1.6 | 15.7 |
| HF acid | 402.0 | 2,298.0 |
| Total | 7,478.4 |  |

TABLE—Continued

|  | Tons/day | Barrels/day |
|---|---|---|
| HF acid degassing column feed (17): |  |  |
| Light hydrocarbons | 397.4 | 4,038.6 |
| HF acid | 1,592.7 | 9,104.7 |
| Water | 16.1 | 92.0 |
| Acid soluble oils | 0.3 |  |
| Total | 2,006.5 |  |
| Overhead from degassing column (20): |  |  |
| Light hydrocarbons | 397.4 | 4,038.6 |
| HF acid | 402.0 | 2,298.0 |
| Water | 4.0 | 22.9 |
| Acid soluble oils | 0 |  |
| Total | 803.4 |  |
| Bottoms from degassing column (21): |  |  |
| Light hydrocarbons | 0 |  |
| HF acid | 1,190.7 | 6,806.6 |
| Water | 12.1 | 69.2 |
| Acid soluble oils | 0.3 |  |
| Total | 1,203.1 |  |
| Rich HF acid from extractor (25): |  |  |
| Propane | 337.3 | 3,806.1 |
| Ethyl fluoride | 735.4 |  |
| HF acid | 1,592.7 | 9,104.7 |
| Water | 16.1 | 92.0 |
| Acid soluble oils | 0.3 |  |
| Total | 2,681.8 |  |
| Propane product (31) | 5.7 | 64.3 |
| n-Butane product (37) | 36.0 | 352.4 |
| Product alkylate (38) | 1,524.1 | 12,990 |

NOTE.—Propane purity, 99+%; n-butane purity, 90.8%.

| Process conditions: |  |
|---|---|
| Catalyst/hydrocarbon vol. ratio to reactor | 4:1 |
| iC$_4$/total olefin mol ratio to reactor | 5:1 |
| Reactor temperature, °F | 90 |
| Reactor pressure | 190 |
| Reactor residence time, seconds | 140 |
| Butylene/ethylene plus C$_2$H$_5$F, weight ratio | 0.3:1 |
| Ethylene conversion (per pass), percent | 93.5 |
| Debutanized alkylate yield: |  |
| Lbs./lb. olefin | 2.04 |
| Bbl./100 lbs. olefin | 0.871 |
| Extractor (16): |  |
| Pressure, p.s.i.g. | 250 |
| Temperature, °F | 120 |
| Weight ratio liquid HF solvent to C$_2$H$_5$F in feed | 1.6:1 |
| Alkylate properties (38): |  |
| API gravity | 79.3 |
| Density, lbs./gal | 5.587 |
| Avg. mol weight, lbs./mol | 90.4 |
| Research octane (0 cc. TEL) | 100.4 |
| Motor octane (0 cc. TEL) | 95.1 |

We have observed that ethylene conversion is a function of the amount of heavier olefin (heavier than the required ethylene) promoter used in our process. The higher amount of heavier olefin increased the conversion of ethylene to alkylate. Also, the heavier alkyl fluoride produced in the alkylation step is converted to additional high quality alkylate in the presence of the added heavy olefin.

The isoparaffins which can be used in our process include isobutane and/or isopentane. The olefins, in addition to the required ethylene, can include propylene, butylenes, amylenes, and hexenes, either alone or in combination.

The ranges of isoparaffins to olefins mol ratios can be about 1.5 to 1 up to about 20 to 1.

The catalyst to hydrocarbon volume ratios can be about 1 to 1 to about 10 to 1.

The HF catalyst used can have about 80 weight percent up to about 100 weight percent HF, other components being water, usually less than about 5 weight percent, and acid soluble oils.

Reactor temperatures can be about 40° F. to about 175° F. with pressures being sufficient to maintain the now preferred liquid phase system.

The weight ratio of liquid HF solvent to ethyl fluoride to be absorbed can range from about 1 to 1 up to about 5 to 1, at temperatures and pressures to minimize yield of liquid propane out of bottom of tower.

Fractionation conditions are well known in the prior art.

Although the invention has been described as being primarily applicable in its now contemplated best mode due to production to diisopropyl from isobutane and ethylene employing a higher olefin, e.g., isobutylene to promote the reaction it will be obvious to one skilled in the art in possession of this disclosure having studied the same that the invention and its concepts can have other applications.

Reasonable variation and modification are possible within the scope of the foregoing disclosure, drawing and the appended claims to the invention the essence of which is that alkyl fluoride and propane are separated in an alkylation operation by extraction of the alkyl fluoride from the propane using liquid HF catalyst, which can be recycled, and that propane is recovered from the extracted propane stream by stripping HF therefrom, substantially as described.

We claim:

1. A process for the alkylation of an isoparaffin with ethylene and in the presence of a higher olefine promoter with a catalyst consisting essentially of hydrogen fluoride which comprises conducting said alkylation in an alkylation zone to produce an alkylation effluent, separating from said effluent an alkylate containing hydrocarbon phase and a hydrogen fluoride phase, recovering from said hydrocarbon phase an isoparaffin-containing stream also containing hydrogen fluoride, propane and alkyl fluoride including ethyl fluoride, returning a portion of said stream to said zone, passing another portion of said stream to a depropanizer zone, separating in said depropanizer zone an isoparaffin stream from a lighter stream containing HF, alkyl fluoride including ethyl fluoride and propane, passing said lighter stream to an extraction zone, subjecting said lighter stream in said extraction zone to solvent extraction with liquid HF to remove alkyl fluoride including ethyl fluoride into said liquid HF thus generating an extracted stream of propane containing HF, and an extract stream containing liquid HF and alkyl fluoride including ethyl fluoride and passing said extract stream to said alkylation zone.

2. A process according to claim 1 wherein the stream containing propane and HF is passed to an HF stripping zone, in said stripping zone HF is stripped from said propane and propane is recovered as a separate stream.

3. A process according to claim 1 wherein the isoparaffin is at least one of isobutane and isopentane and the higher olefin is at least one of a butylene, an amylene and a hexene.

4. A process according to claim 1 wherein the isoparaffin is isobutane, the olefin is isobutylene and the alkyl fluoride is essentially ethyl fluoride.

References Cited

UNITED STATES PATENTS

| | | | |
|---|---|---|---|
| 3,209,051 | 9/1965 | Bauer et al. | 260—683.48 |
| 2,542,927 | 2/1951 | Kelley | 260—683.48 |
| 2,387,162 | 10/1945 | Matuszak | 260—683.48 |
| 2,320,629 | 6/1943 | Matuszak | 260—683.42 |
| 2,392,048 | 1/1956 | Kassel | 260—683.41 |

DELBERT E. GANTZ, Primary Examiner

G. J. CRASANAKIS, Assistant Examiner

U.S. Cl. X.R.

260—683.51